United States Patent [19]

Krenzer et al.

[11] 4,298,785
[45] Nov. 3, 1981

[54] METHOD AND DEVICE FOR AUTOMATICALLY TRACKING SYSTEMS TO THE CENTER OF WELD GAPS, WELD JOINTS AND WELD REINFORCEMENTS

[75] Inventors: Paul Krenzer, Hamm-Pelkum; Franz-Josef Peters; Karl-Heinz Schlusnus, both of Hamm; Hans J. Wahl, Münster, all of Fed. Rep. of Germany

[73] Assignee: Hoesch Werke Aktiengesellschaft, Dortmund, Fed. Rep. of Germany

[21] Appl. No.: 35,329

[22] Filed: May 2, 1979

Related U.S. Application Data

[63] Continuation-in-part of Ser. No. 840,834, Oct. 11, 1977.

[30] Foreign Application Priority Data

Oct. 16, 1976 [DE] Fed. Rep. of Germany ....... 2646838

[51] Int. Cl.³ .............................................. B23K 9/12
[52] U.S. Cl. ................................. 219/124.34; 228/9; 318/576; 318/652
[58] Field of Search ........... 219/124.1, 124.22, 124.34; 228/8, 9; 318/576, 577, 638, 652, 669

[56] References Cited

U.S. PATENT DOCUMENTS

| | | | |
|---|---|---|---|
| 2,743,429 | 4/1956 | Erdman et al. | 318/652 |
| 4,192,986 | 3/1980 | Udagawa et al. | 219/124.34 |

Primary Examiner—C. C. Shaw
Attorney, Agent, or Firm—Max Fogiel

[57] ABSTRACT

An arrangement for automatically tracking systems to the center of weld gaps, weld joints or weld reinforcements, in which one or more electrically scanning probes receive signals reflected by a workpiece surface as long as this surface is substantially parallel to the acting surface of the probe. The signals breakdown spontaneously when the surface clearly deviates from the parallel as in the case with the flanks of gaps, joints or reinforcements. The breakdown of the signal is applied for storing an electrical value corresponding to the instantaneous probe position, the probe position for the left flank when traveling from left to right and for the right flank when traveling from right to left. The center of the gap, of the joint or of the reinforcement is computed from the stored electronic position values in a series-connected electronic device, by means of a computer circuit. The computer value is compared with an electrical value corresponding to the center position of the system, and in case there is a difference between the compared values, a corresponding control command is formed. The width of the gap, joint or reinforcement is determined electronically and compared with a given empirical value. The gradient of the seam center deviation may also be determined and compared with a given empirical value. The latter two comparisons are useful for increasing the reliability of operation of the tracking device.

11 Claims, 6 Drawing Figures

METHOD AND DEVICE FOR AUTOMATICALLY TRACKING SYSTEMS TO THE CENTER OF WELD GAPS, WELD JOINTS AND WELD REINFORCEMENTS

BACKGROUND OF THE INVENTION

The present application is a continuation-in-part of the parent application Ser. No. 840,834, filed Oct. 11, 1977.

The present invention relates to a method and device for automatically tracking systems to the center of weld gaps, weld joints or weld reinforcements by means of one or more electrically or mechanically scanning probes which receives signals reflected by the workpiece surface as long as this surface runs parallel to the acting surface of the probe; these signals breakdown spontaneously when the workpiece surface clearly deviates from the parallel as in the case with the flanks of gaps, joints or reinforcements.

A similar method is already known (paper by: The Welding Institute, 1975, "A technical survey of seam tracking in welding", pp. 111-114). With this method, the workpiece surface is scanned by an electron beam transverse the weld seam and the number of resulting secondary electrons depending on the path is used for reproducing a picture of the weld seam on an oscillograph. The position of the resulting minimum is used as center signal.

Aside from the fact that this method is applicable only to one use, the electron beam welding, it has the following disadvantages: Depending on the joint or gap geometry, there may be one or several minima so that no distinct center signal can be formed. Geometric unevenness next to the weld joint may lead to signals similar to those of the joint so that no clear automatic evaluation can be formed.

It is, therefore, an object of the present invention to provide a method for tracking systems automatically to the center of weld gaps, weld joints or weld reinforcements where the disadvantages of the known method are avoided.

Another object of the present invention is to provide an arrangement of the foregoing character which is simple in construction and may be economically fabricated.

A further object of the present invention is to provide an arrangement, as described, which may be readily maintained in service and which has a substantially long operation life.

SUMMARY OF THE INVENTION

The objects of the present invention are achieved by providing a method for automatically tracking systems to the center of weld gaps, weld joints or weld reinforcements by means of one or more electrically scanning probes which receive signals reflected by the workpiece surface as long as this surface is mainly parallel to the acting surface of the probe; these signals breakdown spontaneously when the surface clearly deviates from the parallel as is the case with the flanks of gaps, joints or reinforcements in the following manner: The breakdown of the signal is used for storing an electrical value corresponding to the instantaneous probe position, the probe position for the left flank when traveling from left to right, and for the right flank when traveling from right to left. The center of the gap, of the joint or of the reinforcement is computed from the stored electronic position values in a series-connected electronic device by means of a computer circuit. This value is then compared with an electrical value corresponding to the center position of the system, e.g., a welding head or a testing unit and, if necessary, a control command is formed from an existing difference.

This has the advantage that, independent of geometry and shape of the weld gap, the weld joint or the weld reinforcement, a distinct center signal is formed as long as the flanks lead to a signal reduction.

In extending the invention, it is expedient if also the width of the gap, of the joint or the reinforcement is determined electronically from and compared with empirical data.

This makes it possible to eliminate interfering signals, e.g., from geometric unevenness next to the seam, from the evaluation and to increase the reliability of operation of the system.

Another embodiment determines the gradient of the seam center deviation and compares it with a given empirical value.

The gradient for a given welding system varies between certain limits. Geometric interferences can mislead greater deviations. This embodiment prevents such interference signals from being evaluated and leading to a faulty control.

A special advantage is available when an ultrasonic transducer is used as a probe.

In this case the measured value formation is independent of the distance changes encountered in practice. In addition, the probe can have a relatively large distance from the workpiece surface which protects it against damage during use.

When, while using an ultrasonic transducer, an additional transit time evaluation of the ultrasonic signals is used, there is the advantage that the edge displacement can be measured and controlled.

To implement the method, a device is used which has an ultrasonic transducer moving across gaps, joints and reinforcements; it is connected to an ultrasonic transmitter and receiver unit and coupled rigidly to an electric displacement pickup. The latter, in conjunction with the ultrasonic transceiver places electrical position signals into storage units connected thereto. They are connected to a storage control which is controlled by the ultrasonic transceiver unit and a direction identification; it is also connected to an electronic computer unit in which the gap, joint and reinforcement characteristics are computed; they are then compared in connected comparators to nominal values. In case of consistency, they relate a seam center value, which in the meantime was placed by the computer into a storage, for comparison with a nominal value in a potentiometer-type pick-off (set point station); the latter is connected to a regulator which adjusts a servo via a power amplifier with a servo drive for a system as, for example, a welding head.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
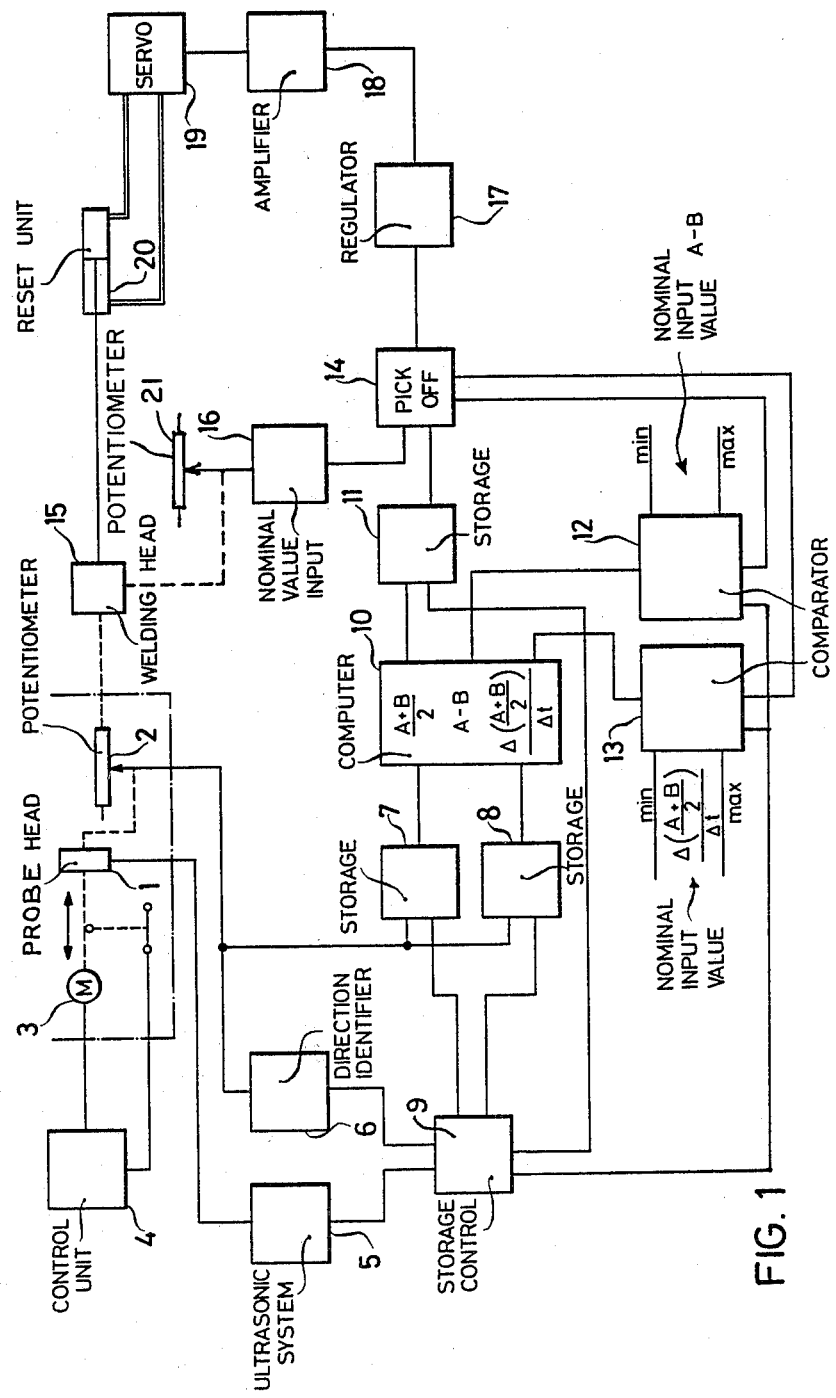
FIG. 1 is a schematic view and shows the essential elements and their interconnections, in accordance with the present invention.

Referring to FIG. 1, an ultrasonic probe 1 which is connected mechanically rigid to the pickoff of potentiometer 2, oscillates over the weld joint range, driven by a motor 3 which is driven by a control unit 4.

A voltage $U_o$-$U_4$ appears at the pickoff of potentiometer 2 proportional to the transversed displacement. Hence potentiometer 2 serves as displacement transducer for determining the position of ultrasonic probe 1.

A commercially available ultrasonic electronic system, consisting of a transmitter, a receiver and a monitor, operates the ultrasonic probe 1 in pulse operation alternately as transmitting and receivng probe. It records the signal drop of the receiving echo below a given threshold value by means of the monitor. This signal drop, according to the rules of reflection, occurs on the flanks of a weld gap, joint or reinforcement which are not parallel to the probe area.

Figure 3:
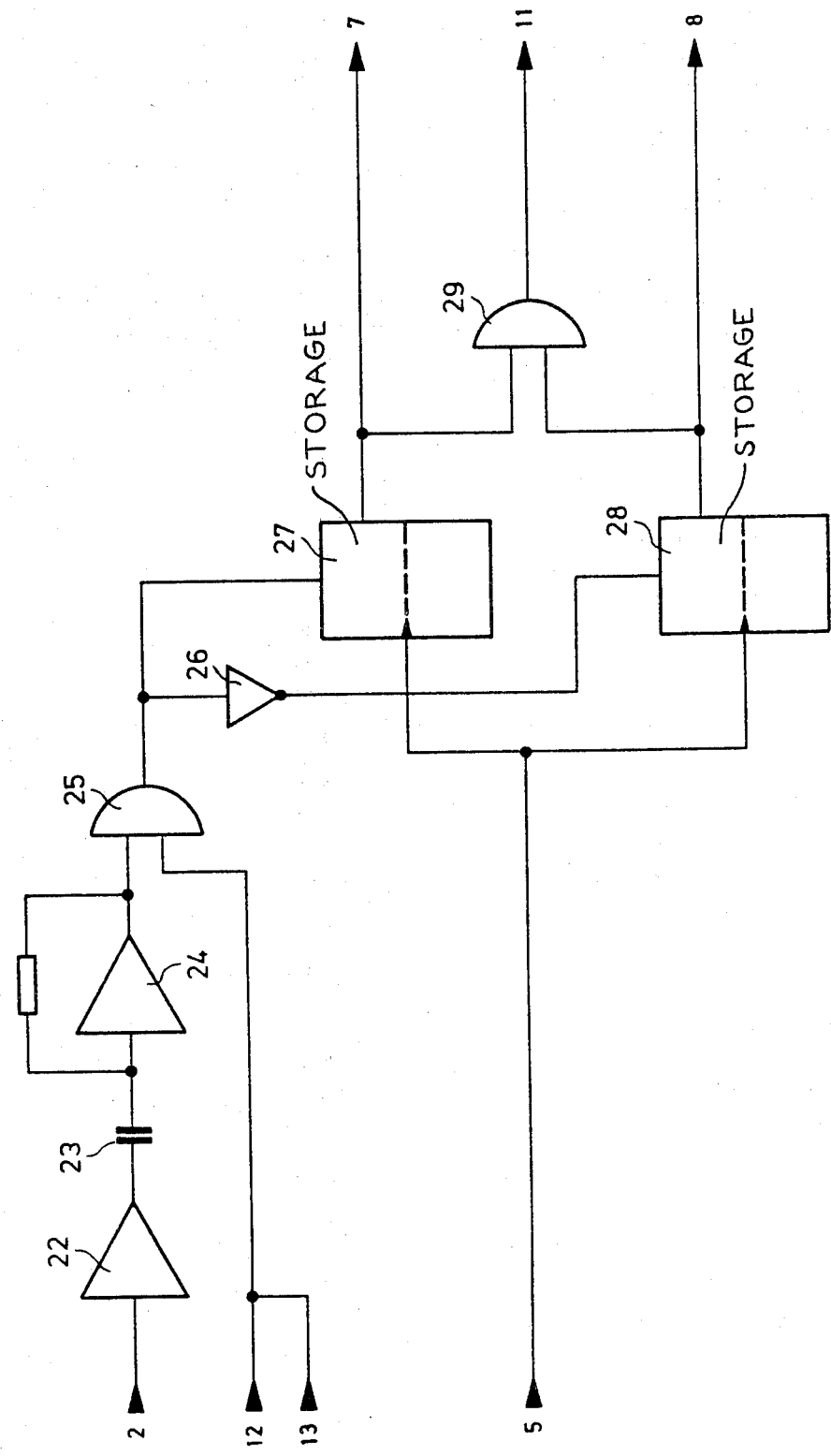
FIG. 3 shows the electronic circuit details of blocks 6 and 9 and their connection to the other blocks in FIG. 1.

FIG. 3 shows the circuit diagram of the direction identifier 6 and storage control 9, assembled from commercial components, and their placement in the control circuit.

Figure 2A:
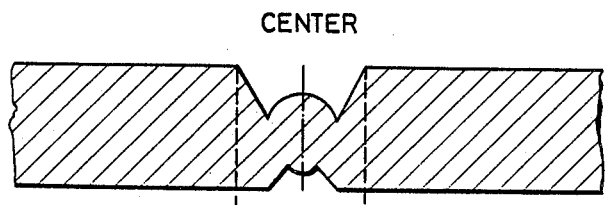
FIGS. 2a, b, c, and d show diagrammatic views for the generation of signals in arrangement of the present invention.
Figure 2B:
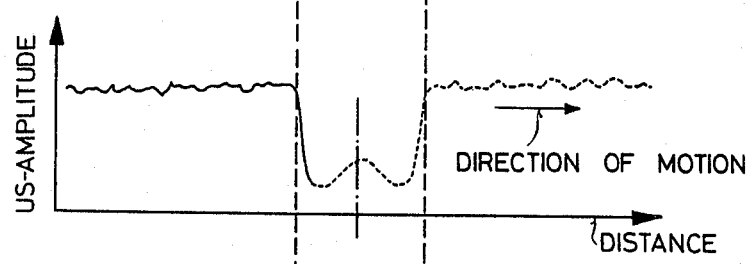
Figure 2C:
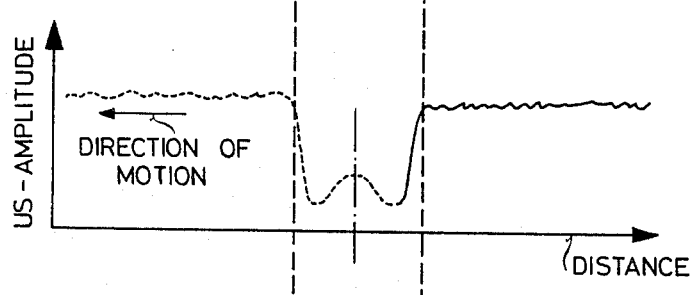
Figure 2D:
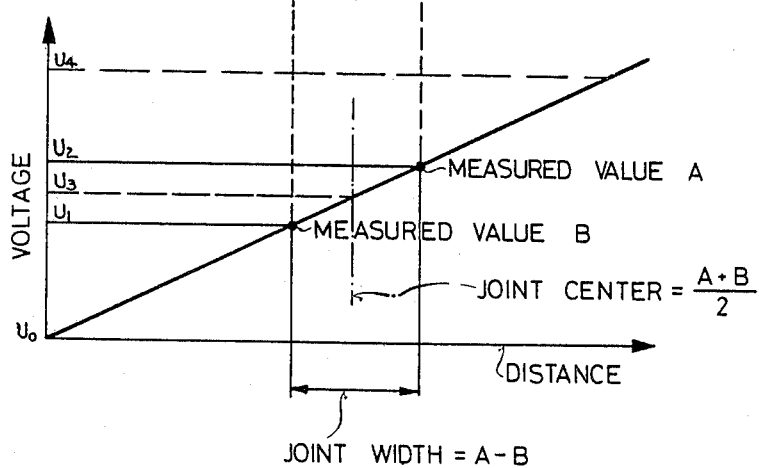

The direction identifier 6 measures the voltage changes on the potentiometer 2 during the oscillating movement of the ultrasonic probe 1 (FIG. 2d). During reversal in voltage change, which takes place at the turning points of the oscillating movement, a pulse is generated which is passed on to the storage control 9 as direction pulse (voltage increases direction), FIG. 2b; voltage decrease direction, (FIG. 2c).

The storage control 9 has the following function.

By means of the direction pulse, the signal drop, determined in the ultrasonic value (signal breakdown) is assigned to the associated direction of movement of ultrasonic probe 1, so that the measured values A (voltage $U_2$) are stored in storage 7 and the measured values B (voltage $U_1$) are stored in storage 8 according to the direction. For this purpose, the storage control 9 enables storages 7 and 8 as soon as the ultrasonic electronic system 5 has recorded the signal breakdowns.

In an electronic computer 10, the values A and B placed in storages 7 and 8 are processed into the following terms:

1. joint center (voltage $U_3$) $\triangleq$ (A+B)/2
2. joint width (voltage $U_2 - U_1$) $\triangleq$ A−B
3. joint deviation gradient (voltage deviation $\Delta U_3$)

$$\underline{\Delta} \triangleq \frac{\Delta\left(\frac{A+B}{2}\right)}{\Delta t}$$

where $\Delta t$ is the time interval between two successive direction pulses in the same direction and $$\Delta\left(\frac{A+B}{2}\right)$$

is the deviation of the joint center position from the previous one after time interval $\Delta t$.

The joint mean value (A+B)/2 required for control is fed into a storage 11 and released by the storage control 9 for control only when the joint width and the joint deviation gradient, compared in comparators 12 and 13 with the minimum and maximum nominal values, are within the given limit values. The joint mean value (A+B)/2 is then compared in the pickoff 14 with the nominal value 16, instantaneous joint center position of the tracking welding head.

The nominal position value 16 is applied as voltage value to the pickoff of potentiometer 21, which pickoff is rigidly connected to the welding head 15. In case of a deviation between nominal position value 16 and the computer storage value 11, this voltage difference leads to a control signal formed in regulator 17. This signal, amplified by a power amplifier 18, actuates a reset device 20, coupled to the welding head 15, via a servo 19.

FIG. 2 shows diagramatically the following:

(a) an actual joint profile with tack weld;

(b) and (c) ultrasonic signal levels as a function of the prevailing direction of motion, with the regions of interest to the evaluation being stressed;

(d) the generation of the electrical measured values A and B associated with the ultrasonic signal drops, and the computation of the joint center value (A+B)/2 and the joint width A−B.

Referring to FIG. 3, in amplifier 22 the voltage value of potentiometer 2 is adapted. In amplifier 24 the change in current direction on condenser 23 is amplified and converted to a binary signal. When exceeding the nominal values 12 and/or 13, the passing of the signal from amplifier 24 is blocked in AND gate 25. The output signal of AND gate 25 activates the storage 27 directly and storage 28 via inverter 26 so that the signal of ultrasonic system 5 is stored with assigned direction and is available at the outputs 7 and 8. If there is a signal at the outputs 7 and 8, storage 11 is activated with logic unit 29.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A method for automatically tracking systems to the center of weld gaps, weld joints or weld reinforcements comprising the steps of: using at least one scanning probe for receiving signals reflected by a workpiece surface as long as said surface is substantially parallel to an acting surface of said probe, said signals breakdown spontaneously when the surface clearly deviates from the parallel as in the case with left and right flanks of gaps, joints or reinforcements; said signal breakdown being a decrease in intensity of a reflection signal to a fraction of previous reflection energy; applying the breakdown of the signal for storing an electrical value corresponding to the instantaneous probe position, the probe position for the left flank when traveling from left to right and for the right flank when traveling from right to left; computing as a computed value the center of the gap, of the joint or of the reinforcement from the stored electronic position values; comparing the computed value with an electrical value corresponding to the center position of the system; and forming a control command signal from a difference of compared values for actuating drive means to return said system to the computed center of the weld gap, said signals being evaluated only up to their first reflection breakdown per probe oscillation direction.

2. A method as defined in claim 1 wherein the width of the gap, of the joint or of the reinforcements is determined electronically from the stored electrical position values and compared with a given empirical value.

3. A method as defined in claim 1 wherein the gradient of the seam center deviation is determined and compared with a given empirical value.

4. A method as defined in claim 1 wherein said probe comprises ultrasonic transducer means.

5. A method as defined in claim 1 wherein said scanning probe comprises an electrically operated probe.

6. A method as defined in claim 1 wherein the tracking system comprises a welding head.

7. A method as defined in claim 1 wherein the tracking system comprises a testing unit for checking completed welds.

8. An arrangement for automatically tracking systems to the center of weld gaps, weld joints or weld reinforcements comprising: at least one scanning probe for receiving signals reflected by a workpiece surface as long as said surface is substantially parallel to an acting surface of said probe, said signals breakdown spontaneously when the surface clearly deviates from the parallel as in the case with left and right flanks of gaps, joints or reinforcements, said signal breakdown being a decrease in intensity of a reflection signal to a fraction of previous reflection energy; means for applying the breakdown of the signal for storing an electrical vlaue corresponding to the instantaneous probe position, the probe position for the left flank when traveling from left to right and for the right flank when traveling from right to left; means for computing the center of the gap, of the joint or of the reinforcement from the stored electronic position values; means for comparing the computed value with an electrical value corresponding to the center position of the system; and means for forming a control command signal from a difference of the compared values for actuating drive means to return said system to the computed center of the weld gap, said signals being evaluated only up to their first reflection breakdown per probe oscillation direction.

9. An arrangement as defined in claim 8 wherein the width of the gap, of the joint or of the reinforcements is determined electronically from the stored electrical position values and compared with a given empirical value.

10. An arrangement as defined in claim 8 wherein the gradient of the seam center deviation is determined and compared with a given empirical value.

11. An arrangement as defined in claim 8, wherein the width of the gap, of the joint or of the reinforcements is determined electronically from the stored electrical position values and compared with a given empirical value, the gradient of the seam center deviation being determined and compared with a given empirical value.

* * * * *